(12) United States Patent
Chen et al.

(10) Patent No.: US 7,269,652 B2
(45) Date of Patent: Sep. 11, 2007

(54) ALGORITHM FOR MINIMIZING REBATE VALUE DUE TO SLA BREACH IN A UTILITY COMPUTING ENVIRONMENT

(75) Inventors: Yen-Fu Chen, Austin, TX (US); Erik Alan Daughtrey, Durham, NC (US); Hari Shankar, Morrisville, NC (US); Wenjian Qiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 10/711,981

(22) Filed: Oct. 18, 2004

(65) Prior Publication Data

US 2006/0085544 A1    Apr. 20, 2006

(51) Int. Cl.
G06F 15/173    (2006.01)
(52) U.S. Cl. .................. 709/226; 709/203; 709/224; 709/229; 718/104
(58) Field of Classification Search ........ 709/215–216, 709/223–226, 229, 203; 370/395.21, 395.41; 705/63; 711/150; 718/104
See application file for complete search history.

(56) References Cited

U.S. PATENT DOCUMENTS

| | | | |
|---|---|---|---|
| 6,195,697 B1 | 2/2001 | Bowman-Amuah | 709/224 |
| 6,470,386 B1 * | 10/2002 | Combar et al. | 709/224 |
| 6,556,659 B1 | 4/2003 | Bowman-Amuah | 379/9.04 |
| 6,594,698 B1 * | 7/2003 | Chow et al. | 709/226 |
| 6,728,748 B1 * | 4/2004 | Mangipudi et al. | 718/105 |
| 6,799,208 B1 * | 9/2004 | Sankaranarayan et al. | 709/223 |
| 6,842,783 B1 * | 1/2005 | Boivie et al. | 709/225 |
| 6,857,020 B1 * | 2/2005 | Chaar et al. | 709/226 |

(Continued)

FOREIGN PATENT DOCUMENTS

EP    1 229 685    8/2002

OTHER PUBLICATIONS

"Agilent Technologies announces wireless telecom industry's first real-time Customer-Centric Service Management solution", Software Industry Report, 36, 10, 1, May 24, 2004.*

(Continued)

*Primary Examiner*—Oanh Duong
(74) *Attorney, Agent, or Firm*—Rudolf O. Siegesmund; Gordon & Rees, LLP; Bruce Clay

(57) ABSTRACT

The invention described is a new and useful process for minimizing the overall rebate a provider disburses to customers when a service level agreement (SLA) breach occurs in a utility computing environment. Specifically, the process compares performance data and resource usage with the SLAs of the customers, and reallocates shared resources to those customers who represent a lesser penalty to the provider in the event of an SLA breach. The process determines which resources, used by customers representing the lesser penalty, are operating below peak capacity. The process then reallocates these under-utilized resources to those customers requiring additional resources to meet SLA thresholds. If all resources are operating at peak capacity, the process reallocates the resources to those customers whose SLAs represent a greater penalty in the event of an SLA breach as compared to those customers whose SLAs provide for a lesser penalty, thereby minimizing the total rebate due upon an SLA breach.

3 Claims, 5 Drawing Sheets

U.S. PATENT DOCUMENTS

| | | | |
|---|---|---|---|
| 6,917,979 B1* | 7/2005 | Dutra et al. | 709/229 |
| 6,950,874 B2* | 9/2005 | Chang et al. | 709/229 |
| 6,954,739 B1* | 10/2005 | Bouillet et al. | 705/63 |
| 6,959,335 B1* | 10/2005 | Hayball et al. | 709/227 |
| 7,146,353 B2* | 12/2006 | Garg et al. | 707/2 |
| 2001/0047299 A1 | 11/2001 | Brewer et al. | 705/14 |
| 2002/0059427 A1* | 5/2002 | Tamaki et al. | 709/226 |
| 2002/0156914 A1* | 10/2002 | Lo et al. | 709/238 |
| 2002/0174227 A1* | 11/2002 | Hartsell et al. | 709/226 |
| 2003/0069972 A1* | 4/2003 | Yoshimura et al. | 709/226 |
| 2003/0074245 A1* | 4/2003 | Salle | 705/7 |
| 2004/0010592 A1* | 1/2004 | Carver et al. | 709/226 |
| 2004/0062205 A1 | 4/2004 | Friskney et al. | 370/252 |
| 2005/0015504 A1* | 1/2005 | Dorne et al. | 709/229 |
| 2005/0120102 A1* | 6/2005 | Gandhi et al. | 709/223 |
| 2005/0149940 A1* | 7/2005 | Calinescu et al. | 718/104 |
| 2005/0172291 A1* | 8/2005 | Das et al. | 718/104 |
| 2005/0188089 A1* | 8/2005 | Lichtenstein et al. | 709/226 |
| 2005/0198266 A1* | 9/2005 | Cole et al. | 709/224 |
| 2005/0228878 A1* | 10/2005 | Anstey et al. | 709/224 |
| 2005/0235288 A1* | 10/2005 | Yamakabe et al. | 718/100 |
| 2005/0240668 A1* | 10/2005 | Rolia et al. | 709/223 |
| 2005/0256946 A1* | 11/2005 | Childress et al. | 709/223 |
| 2006/0129687 A1* | 6/2006 | Goldszmidt et al. | 709/229 |
| 2006/0140115 A1* | 6/2006 | Timus et al. | 370/230 |

OTHER PUBLICATIONS

Hutchinson, S., "Service Basics [service level agreement]", CMA Management, vol. 78 No. 3 p. 47-8, May 2004.*

Buco, M.J. et al., "PEM: a framework enabling continual optimization of workflow process executions based upon business value metrics", Service Computing, 2005 IEEE International Conference, vol. 2, pp. 33-40, Jul. 2005.*

Crux-perex, F.A., et al., "Flexible resource allocation strategies for class-based QoS provisioning in mobile networks", Vehicular Technology, IEEE, vol. 53, pp. 805-819 May 2004.*

* cited by examiner

FIG. 2

| Customer | Service/Type | Cost | Breach Award |
|---|---|---|---|
| A | 24x7 "Premium" | $100/day | $200/hour Down Time plus Software Rebate |
| B | 24x7 "Standard" | #30/day | $30/day down Time plus Software Rebate |
| C | 24x7 "Standard" | $30/day | Software Rebate |

PRIOR ART

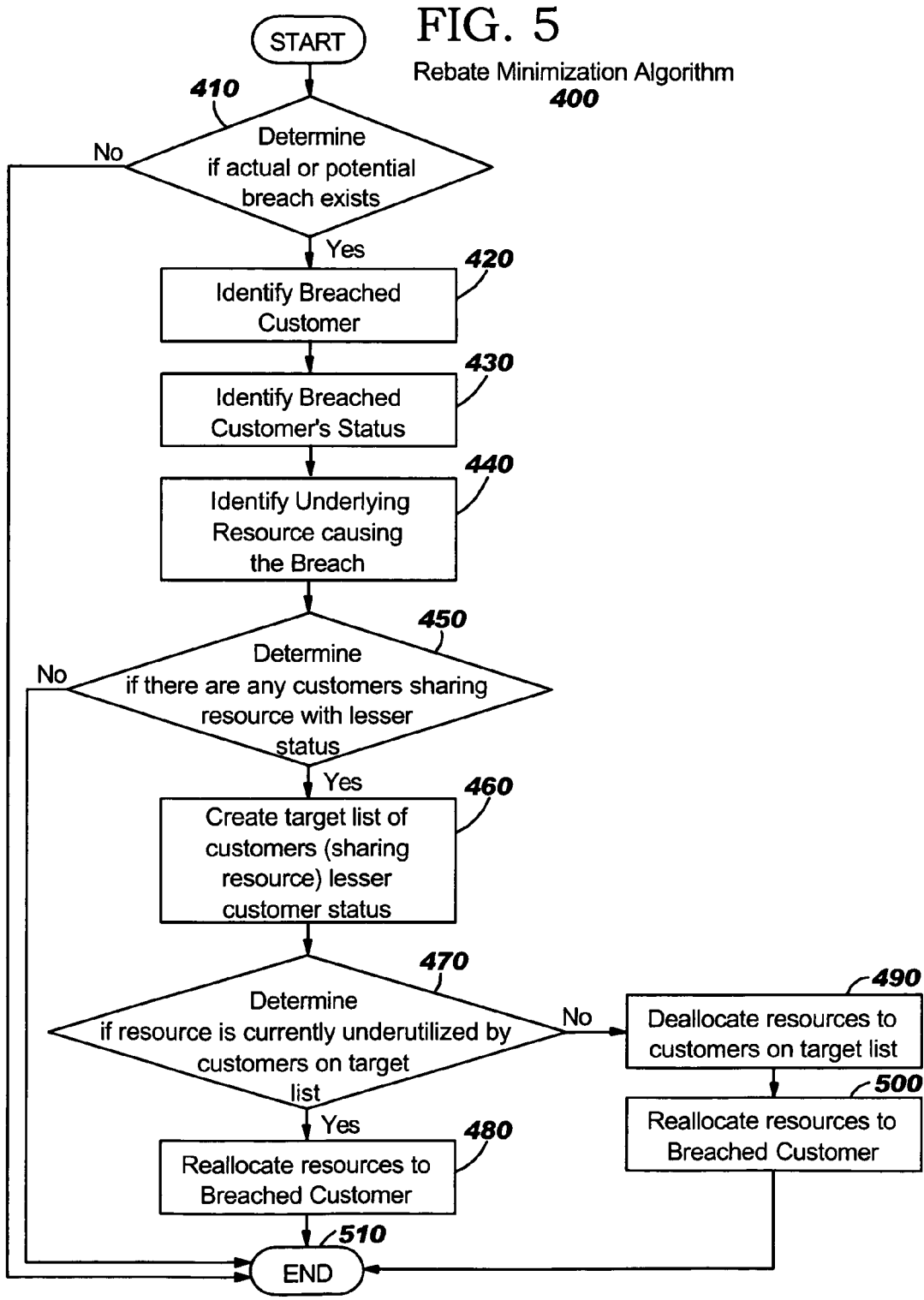

ALGORITHM FOR MINIMIZING REBATE VALUE DUE TO SLA BREACH IN A UTILITY COMPUTING ENVIRONMENT

CROSS-REFERENCE TO RELATED APPLICATION

The present invention is related to the subject matter of U.S. patent application Ser. Nos. 10/166,796, and 10/675,726, both of which are incorporated herein by reference.

FIELD OF THE INVENTION

This invention generally relates to the field of managing resources in a utility computing environment. In particular, this invention relates to a process for minimizing the total value of rebates disbursed to customers, in a utility computing environment, as a result of a service level agreement breach.

BACKGROUND OF THE INVENTION

For years, information technology (IT) organizations (the "providers") have offered IT management services and computing resources to other businesses (the "customers") within a utility computing environment. While a customer may purchase or lease IT resources directly from a provider for that customer's exclusive benefit, a customer also may share a provider's computing resources and management services with other customers. In a typical utility computing environment, the customer does not purchase or lease the physical resources; instead, the provider retains the discretion to allocate the resources as needed to meet its service obligations. Nonetheless, the provider must meet the requirements of each customer sharing the IT resources as specified in a contract or an agreement. If these service requirements are not met, the provider has breached its service obligation to the customer and the provider must compensate the customer for the breach.

As illustrated in FIG. 1, customers of on-demand services share management and computing resources (to the system and subsystem level), including persistent memory ("storage"), volatile memory ("memory"), and processors. FIG. 1 portrays another characteristic of the on-demand model—multiple customers sharing the same subsystem within the same computing resource, such as a logical partition (LPAR). In FIG. 1, for example, customer 3 and customer 4 each could run separate instances of operating system 3, such as International Business Machines, Inc.'s (IBM) Z/LINUX, on a single Z/VM (also by IBM) LPAR. When multiple external customers share the same hardware, as described here, performance tuning of the system must be applicable to both the workload and to all customers sharing the hardware.

A Service Level Agreement (SLA) typically is used in an on-demand shared environment to establish to threshold levels of service and guide the dynamic allocation of IT resources. The SLA is a contract, or series of contracts, that embodies the mutual understandings between the provider and the customer. Thus, any failure to provide the agreed level of service to a customer is referred to herein as an "SLA breach" or "breach." The SLA also sets system (and subsystem) performance expectations and defines the procedures and reports needed to track compliance to the agreement. The SLA may contain the process for reporting service problems, the time frame for problem resolution, the process for monitoring service levels, and the penalties associated with any given SLA breach.

A performance monitoring tool, commonly referred to as a profiling tool, collects performance data to determine compliance with the SLA. The profiling tool tracks and measures performance characteristics of the system including CPU utilization, processing time, and the memory or storage available to a customer. Often, these tools axe designed to operate in a particular environment. Performance Monitoring Infrastructure Request Metrics is an example of a profiling tool designed to operate after deployment in a web-based environment. Additionally, system administrators use the information obtained from these performance measurements ("metrics") to tune the performance of the system and take corrective action if needed. When the profiling tool indicates that system resources are not available, or arc not performing according to the SLA, the SLA is breached. The provider pays a penalty to compensate the customer for the SLA breach according to the terms of the SLA.

One of the fundamental tenets of a utility computing environment is the concept of proactively rebating, i.e., compensating, a customer when an SLA is breached. In a typical on-demand scenario, the various customers hosted by a single provider agree to different levels of service and compensation or "rebate" for an associated breach. For example, some of these customers may be "premium" customers, who pay more for higher service levels and are entitled to greater compensation when there is an SLA breach. These premium customers consequently represent a greater penalty to the provider in the event of an SLA breach. Other customers may subscribe as "standard" customers, who pay relatively less for the services, receive less compensation when there is a breach, and thus, represent a lesser degree of penalty in the event of an SLA breach. A sample scenario is provided in FIG. 2.

In addition to using profiling tools, there are several methods available to IT service providers in the utility computing environment to measure compliance with an SLA. Some of these methods also calculate appropriate rebates to customers in the event of an SLA breach, and proactively disburse a rebate to a customer. These processes are disclosed in U.S. Pat. No. 6,195,697 (issued Feb. 27, 2001), U.S. Pat. No. 6,556,659 (issued Apr. 29, 2003), and U.S. patent application No. 10/166,796. These processes do not address optimizing network resources and managing conflicting needs among the customers of the shared network collectively, nor do these processes address reallocating resources among the customers to minimize the total rebate awarded in the event of an SLA breach.

Patent application Ser. No. 0062205 (published Apr. 1, 2004) assigns a financial value to identified performance flows based on SLA requirements and penalties for breach of the requirements. This financial value alerts operators of the possible financial impacts of reconfiguring hardware or software associated with those identified flows. This process, however, merely calculates and displays the financial loss associated with a breach or potential breach of one individual customer's SLA. U.S. patent application No. 10/675,726 does provide a method for estimating an SLA breach value, based on data acquired from an individual customer and on data acquired from an aggregated group of customers. But again, this method does not disclose a means for minimizing the total rebate a service provider must offer when an SLA is breached.

Thus, the tools used to track and measure the performance characteristics of transactions throughout a system to determine compliance to an SLA are common. Similarly, processes for calculating the rebate that a service provider must proactively award to a customer when the SLA is breached are not new. There is not, however, a tool or process available to service providers for minimizing the total rebate a service provider awards in the event of an SLA breach.

Rebates in the form of monetary compensation, free software, or other forms, are costly to service providers. Rebates affect a provider's overall profitability as well impact the provider's goodwill. After all, those customers who have paid a premium price for service are not receiving the level of service agreed upon. These customers may suffer financial losses and losses of goodwill, as well, if they, in turn, cannot meet their business demands. Therefore, one skilled in the art should appreciate the advantages of an invention that precisely addresses the problem of minimizing rebates the service providers disburse to customers as a result of an SLA breach. This and other objects of the invention will be apparent to those skilled in the art from the following detailed description of a preferred embodiment of the invention.

SUMMARY OF THE INVENTION

The invention described is a new and useful process for minimizing the overall rebate a provider disburses when an SLA breach occurs in a utility computing environment. The inventive process calculates the total minimum rebate value payable by a provider to a customer, or group of customers, in the event of an SLA breach. The process compares performance data and resource usage with the SLAs of the customers, and reallocates shared resources to those breached customers who represent a lesser penalty to the provider in the event of an SLA breach. Specifically, the process determines if there is a breach, and if so, identifies the breached customer and the breached customer's status based on the penalty provided in the SLA. The process also identifies the underlying resource causing the breach. The process then creates a list of customers with a lower customer status and determines if any of the customers with the lower status are under-utilizing the resource. If the resource is under-utilized, the process then reallocates these under-utilized resources to those breached customers requiring additional resources to meet SLA thresholds. If all resources are operating at peak capacity, the process reallocates the resources to those customers whose SLAs provide a greater penalty in the event of an SLA breach, as compared to those customers whose SLAs provide for a lesser penalty, thereby minimizing the total rebate due upon an SLA breach.

BRIEF DESCRIPTION OF THE SEVERAL VIEWS OF THE DRAWINGS

The novel features believed characteristic of the invention are set forth in the appended claims. The invention itself, however, as well as a preferred mode of us; further objectives and advantages thereof, will be understood best by reference to the following detailed description of an illustrative embodiment when read in conjunction with the accompanying drawings, wherein:

FIG. 2 depicts an exemplary customer scenario in a utility computing environment;

FIG. 5 depicts the inventive process for minimizing rebates disbursed to customers sharing IT resources.

DETAILED DESCRIPTION OF THE PREFERRED EMBODIMENT

Figure 1:
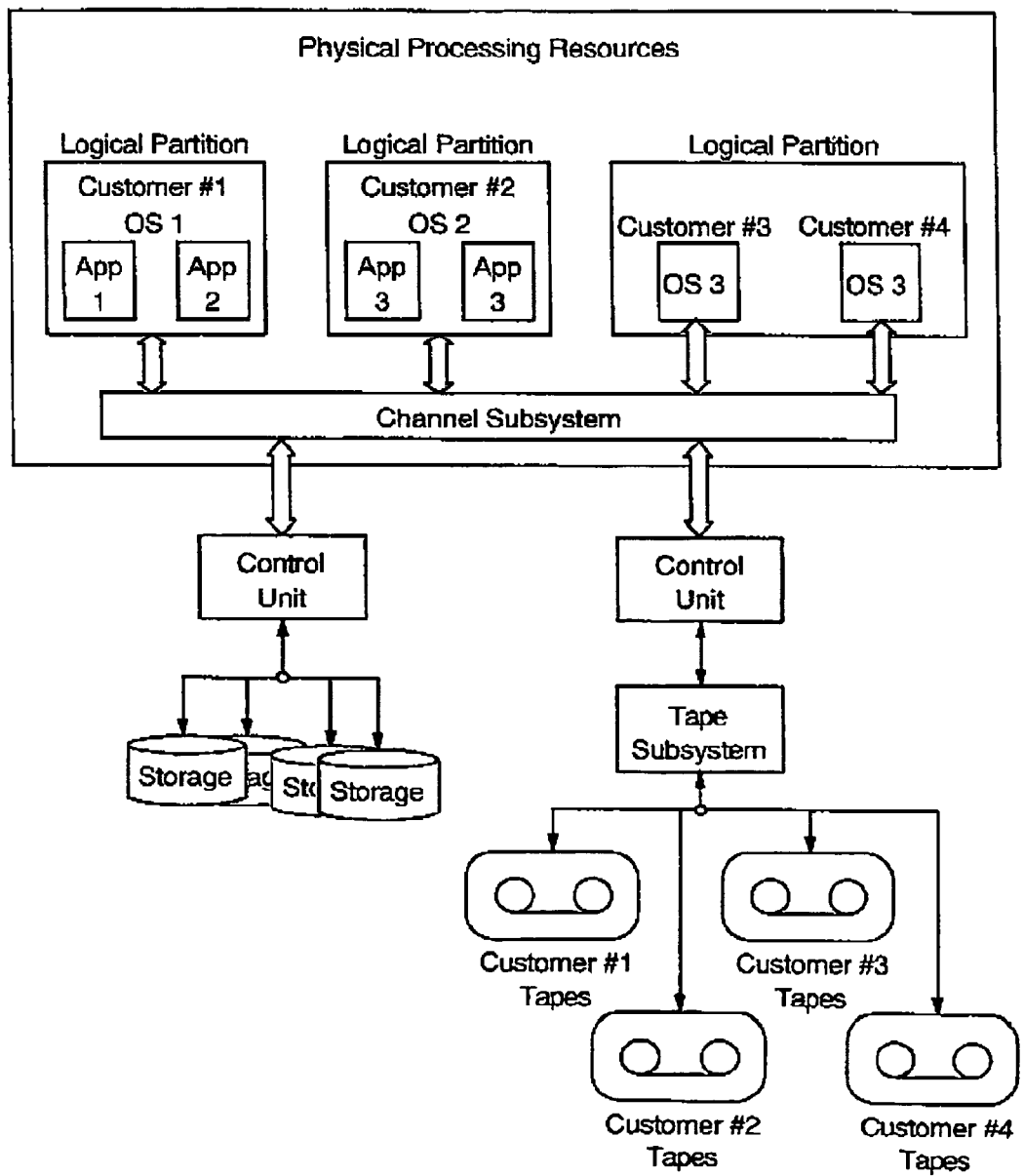
FIG. 1 illustrates an exemplary shared resource configuration.

The present invention is a process for minimizing the total rebate value that an IT provider disburses to customers in the event of an SLA breach. The invention, although operable in a variety of hardware and software configurations, operates in a utility computing environment wherein an IT service provider allocates shared IT resources to customers according to the terms of previously established SLAs.

The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software. A "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Rebate Minimization Algorithm" (RMA).

The RMA calculates the total minimum rebate value payable by an IT service provider to a customer, or group of customers, in the event of an SLA breach. As used herein, the term "service provider" or "provider" refers to any entity that provides management services and computing resources to any individual or entity. A "customer" is any individual or entity acquiring the management services and shared computing resources from the service provider.

Notably, the RMA determines if the provider has breached an SLA. If so, the RMA reallocates under-utilized resources to meet the demands of the breached customer if the breached customer represents a greater penalty to the provider than those customers under-utilizing the resources. A "penalty," as that term is used here, refers to the amount of compensation or rebate a provider must pay a customer for breaching an SLA. The compensation the customer receives from the provider determines the customer's "status." If all resources are operating at peak capacity, the RMA reallocates the resources used by customers with a lower customer status to the customers with a higher customer status, thereby minimizing the total rebate cost associated with an SLA breach.

As noted above, in a utility computing environment, a service provider offers management services and computing resources to a customer at the system and subsystem level. Inasmuch as the customer acquires services and resources from the provider, the customer may, in turn, offer goods, services, or information, for purchase, lease, or use to other individuals or entities, usually via the Internet. Any such individual or entity purchasing, leasing, or otherwise obtaining or using goods, services, or information from the customer is referred to herein as a "consumer." In other words, the consumer may purchase items on-line from the customer's website. The consumer communicates with the customer by means of a network, routed through a utility computing environment, which the provider maintains. The amount of IT resources available to the customers, in the utility computing environment, determines the number of consumers a customer may host on its website at any particular instance, and thus, further determines the amount of business that a customer may transact.

Figure 3:
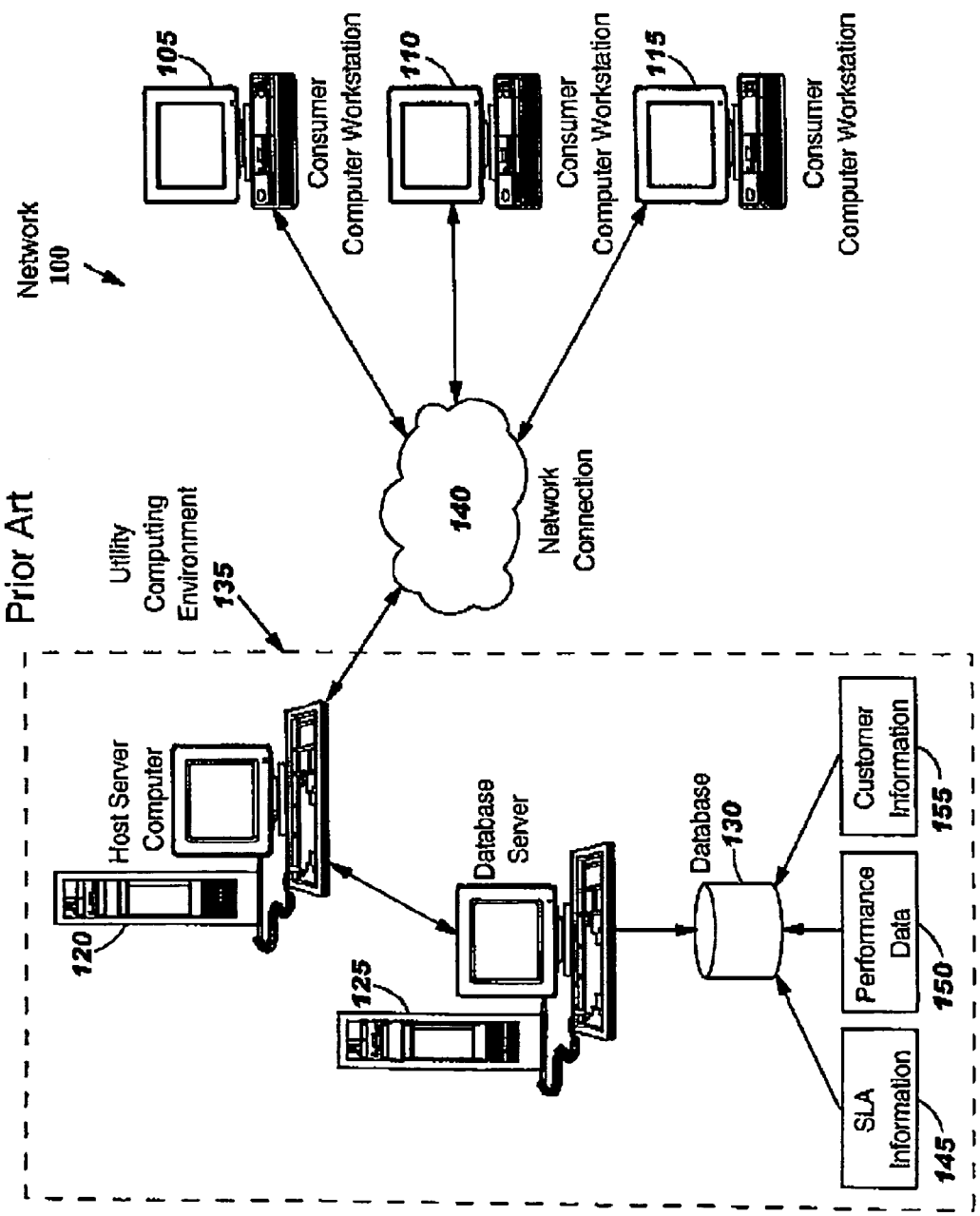
FIG. 3 represents an exemplary prior art network of computers and other hardware devices, in which the Rebate Minimization Algorithm may be implemented.

The inventive RMA is described in detail below with reference to an exemplary prior art network of hardware devices, as depicted in FIG. 3. A "network" comprises any number of hardware devices coupled to and in communication with each other through a communications medium, such as the Internet. A "communications medium" includes without limitation any physical, optical, electromagnetic, or other medium through which hardware or software can transmit data.

For descriptive purposes, exemplary prior art network 100 has a limited number of nodes, including consumer workstation computer 105, consumer workstation computer 110, consumer workstation computer 115 (collectively consumer workstation computers 105-115), host server computer 120, database server computer 125, and database 130. The term "server" refers to a computer system that is shared by multiple clients. A server may refer to the entire computer system, i.e., hardware and software, or just the software that performs the service. For example, the term "database server", as used herein, refers to the both the hardware and software necessary to store and retrieve data. In contrast, the term "web application server", as used herein, refers to any software product designed to operate in a web-environment, such as an HTTP server that manages requests from a browser and delivers HTML documents and files in response. Web server software is frequently used in e-commerce and executes server-side scripts, such as Java Script and Java server pages (JSPs), to retrieve data from a database and display the data in the form of a web page via browsers or client applications. The term "host server computer" refers to the hardware on which the RMA and customers' resources reside. A person of skill in the art also should appreciate that a database may exist in many forms. As used herein, the term "database" generally refers to any collection of data stored together and organized for rapid search and retrieval, including without limitation flat file databases, fielded databases, full-text databases, object-oriented databases, and relational databases. While host server computer 120, database server computer 125, and database 130 are further located within utility computing environment 135, consumer workstation computers 105-115 are outside of the utility computing environment 135.

Host sewer computer 120 hosts programs, applications, and tools that control consumption of computing resources in utility computing environment 135. Therefore, in this embodiment, the consumer accesses the utility computing environment 135 via consumer computer workstations 105-115 networked to host server computer 120 by network connection 140. The amount of IT resources available to the customer, as allocated by applications installed on host server computer 120, determine the actual number of consumers that may access the customer's website, and thus determine the number of consumers That a customer may service. Network connection 140 comprises all hardware, software, and communications media necessary to enable communication between network nodes 105-130 Consumer workstation computers 105-115 use publicly available protocols or messaging services to communicate with the host server computer 120 through network connection 140. Host server computer 120 interacts with database server 125 to store and retrieve SLA information 145, system performance data 150, and customer information 155 to and from database 130. SEA information includes the level of service on which the customers and providers have agreed, and the penalty the provider pays when the provider breaches the SLA. Performance data, obtained in a web application environment, may include the retrieve rate from the web application server to the database, the time to request and return a displayed web-page, and the number of pooling requests, i.e., the number of users, an application can manage. Customer data may include information regarding inventory, shipping, prices, and consumer records. The nodes in the utility computing environment 135 also use publicly available network protocols; however, a firewall may control access to the utility computing environment 135.

Figure 4:
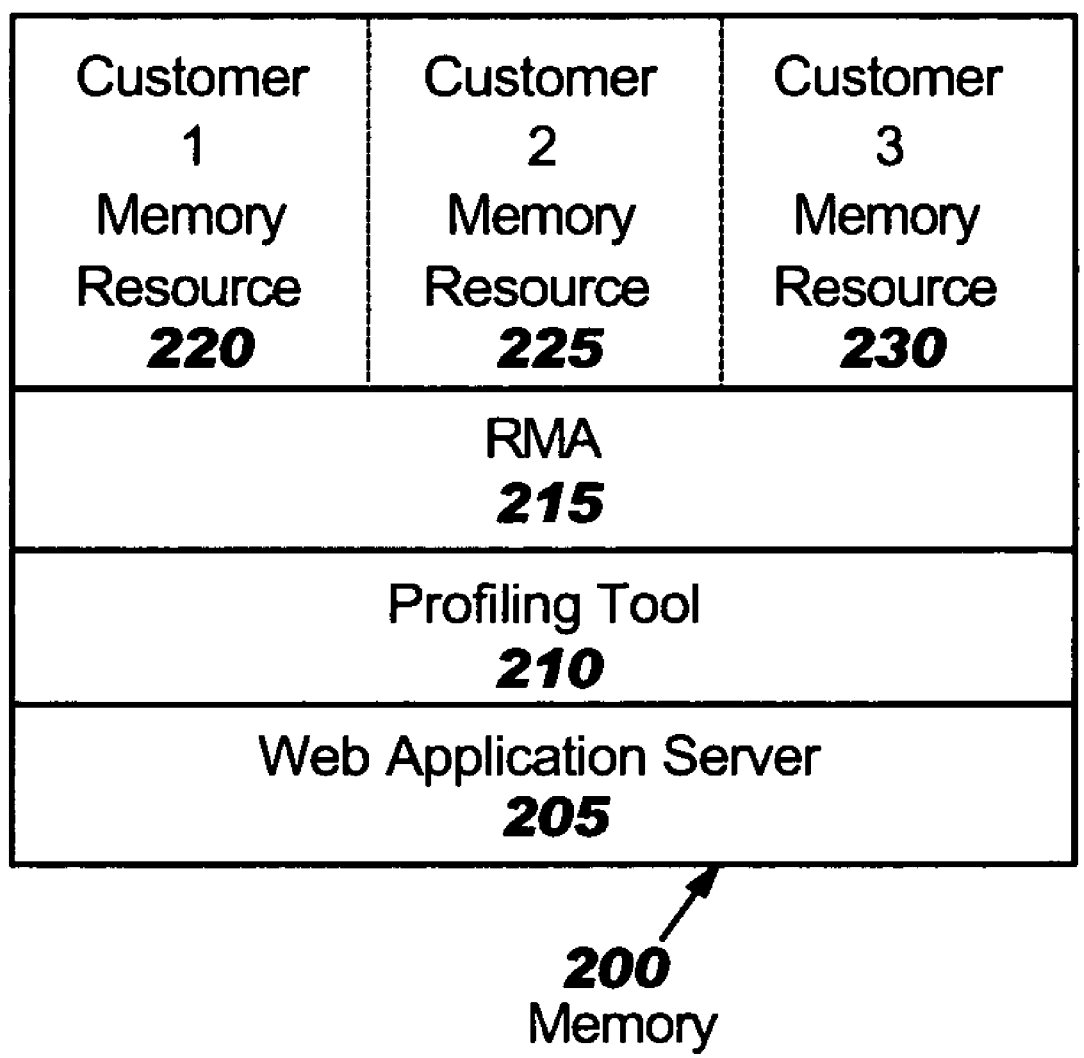
FIG. 4 is a schematic diagram of the host server memory used to implement the Rebate Minimization Algorithm.

Memory 200 of host server computer 120 typically contains various applications such as web application server 205, profiling tool 210, and RMA 215, as depicted in FIG. 4. The term "memory," as used herein, includes without limitation any volatile or persistent medium, such as an electrical circuit, magnetic disk, or optical disk, in which a computer can store data or software for any duration. A single memory may encompass and be distributed across a plurality of media. Memory 200 may include additional data and applications. Memory 200 also contains customer 1 memory resource 220, customer 2 memory resource 225, and customer 3 memory resource 230 (collectively customer memory resources 220-230), as represented schematically in FIG. 4. Web application server 205 executes server-side scripts, such as Java Script and JSPs, to retrieve data from a database and transmit data in the form of a web page to the consumer workstation computers 105-115.

Profiling tool 210 collects performance data 150 by tracking and timing individual transactions within utility computing environment 135. Web application server 205 actively allocates customer memory resources 220-230 as part of its normal operation. FIG. 4 is included as a descriptive expedient and does not necessarily reflect any physical embodiment of memory 200. Notably, customer memory resources 220-230 represent any number of shared resources. The term "shared resource" includes any computing resource that the service provider allocates among various customers according to the terms of the customer's SLAS. Although volatile memory is depicted in FIG. 4 as the allocated resource, other resources, such as persistent memory, CPU utilization, and network bandwidth may be provisioned according to the SLA. For descriptive purposes, the applications are stored on host server computer 120, but these applications may be located on any server which the host server computer is capable of accessing.

As FIG. 5 depicts, RMA 215 determines if there is an SLA breach or a potential SLA breach, by comparing the resource usage of the customers, as indicated by performance data 150, with the corresponding customer SLA information 145 (410). If there is an actual or potential breach, RMA 215 identifies the breached customer, the breached customer's status, and the underlying resource causing the breach (420, 430, and 440). Customer status is determined by the severity of the penalty, i.e., the amount the provider rebates the customer, for services not rendered, when the provider breaches the SLA. RMA 215 then determines if there are any customers, sharing the underlying resource causing the breach, with a lower customer status than the breached customer (450). If there are no customers with a lower customer status than the breached customer, the current breach scenario is the optimal scenario, no resources are allocated, and the process ends (510). If there are customers sharing the underlying resource causing the breach, then RMA 215 next creates a target customer list, which includes all customers whose status is lower than the breached customer's status (460). RMA 215 determines if the resource usage of customers included in the target customer list is less than specified in the corresponding SLAs, i.e., the resources are not operating at peak capacity and therefore are under-utilized (470). If the resources are under-utilized, RMA 215 reallocates the under-utilized resources to the breached customer to minimize the rebate value disbursed for the SLA breach, and the process ends (480 and 510). In contrast, if RMA 215 determines that all customers are operating at peak capacity by using the resources to the maximum extent specified in the SLA so that the resource is not under-utilized, RMA 215 releases the resource allocated to customers having a lower customer status, as indicated in the target customer list. RMA 215 then reallocates the resources to the breached customer who represents a greater penalty to the provider (470, 490, and 500). RMA 215 thus determines the minimum total rebate payable by the provider for an SLA breach and the process ends (510).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A process for allocating a resource by a service provider having a plurality of service level agreements with a plurality of customers in a shared web application environment in which a web application server retrieves data from a database and transmits data in a displayed web page to a plurality of consumer computers, the process comprising:

classifying the plurality of customers into a plurality of premium customers and a plurality of standard customers;

collecting a performance data for one of the plurality of premium customers by tracking and timing a plurality of transactions within the shared web application environment;

comparing the performance data with an agreed service level for the one of the plurality of premium customers to determine if there is a breach of the agreed service level;

determining that an available resource of the one of the plurality of premium customers cannot provide the agreed service level resulting in the breach of the agreed service level;

in response to the breach of the agreed service level for the one of the plurality of the premium customers, determining if the available resource has been allocated to one of a plurality of customers that are not using the available resource;

if the available resource has been allocated to the one of the plurality of customers that are not using the available resource, re-allocating the available resource from the one of the plurality of customers to the one of the plurality of the premium customers;

if the available resource has not been allocated to the one of the plurality of customers that are not using the available resource, determining if the available resource has been allocated to one of the standard customers; and if the available resource has been allocated to the one of the standard customers, re-allocating the available resource from the one of the standard customers to the one of the plurality of the premium customers;

wherein the one of the plurality of premium customers is entitled to a first compensation rate when there is the breach of the agreed service level with the one of the premium customers;

wherein the one of the plurality of the standard customers is entitled to a second compensation rate when there is a breach of an agreed service level with the one of the plurality of the standard customers;

wherein the second compensation rate is less than the first compensation rate;

wherein the performance data includes a retrieval rate from the web application server to the database, a time to request and return the displayed web-page, and a number of users that the web application server manages; and wherein the step of re-allocating the available resource from the one of the standard customers to the one of the plurality of the premium customers is based on the retrieval rate from the web application server to the database, the time to request and return the displayed web-page, the number of users that the web application server manages, a target list of the standard customers, a first status of the one of the standard customers, and a second status of the one of the plurality of the premium customers.

2. A data processing machine for allocating a resource by a service provider to a premium customer in a shared web application environment in which a web application server retrieves data from a database and transmits data in form of a displayed web page to a plurality of consumer computers, the machine comprising:

a processor;

a memory;

a service level agreement stored in the memory, the service level agreement setting a threshold performance level for the resource and a penalty for failing to meet a threshold performance level of the premium customer;

means for causing the processor to measure a performance level of the resource according to a collected performance data; and means for causing the processor to compare the performance level of the resource with the threshold performance level; and responsive to determining that the performance level does not meet the threshold performance level, means for determining if the resource has been allocated to a one of a plurality of customers that are not using the resource, means for re-allocating the resource from the one of the plurality of customers to the premium customer if the resource has been allocated to the one of the plurality of customers that is not using the resource;

responsive to determining that the resource has not been allocated to the one of the plurality of customers that are not using the resource, means for determining if the resource has been allocated to a standard customer in a target list of standard customers, and responsive to determining that the resource has been allocated to the standard customer, means for re-allocating the resource from the standard customer to the premium customer;

wherein the penalty for failing to meet the threshold performance level of the premium customer is greater than a penalty for a breach of a service level agreement of the standard customer;

wherein the means for re-allocating the resource from the standard customer to the premium customer is based on the collected performance data, the target list of the standard customers, a first status of the standard customer, and a second status of the premium customer; and wherein the collected performance data includes a retrieval rate from the web application server to the database, a time to request and return the displayed web-page, and a number of users that a web application at the web application server manages.

3. A program, encoded in a computer-readable storage medium, for allocating a resource to a premium customer by a service provider in a shared web application environment in which a web application server retrieves data from a database and transmits data in the form of a displayed web page to a plurality of consumer computers, the program comprising:

means for determining if a utilization of the resource has caused a breach of a service level agreement with the premium customer;

in response to the breach of the service level agreement with the premium customer, means for determining if the resource has not been allocated to an any customer that is not using the resource;

means for re-allocating the resource from the any customer to the premium customer if the resource has been allocated to the any customer that is not using the resource;

responsive to determining that the resource has not been allocated to the any customer that is not using the resource, means for determining if the resource has been allocated to a standard customer in a target list of standard customers; and responsive to determining that the resource has been allocated to the standard customer, means for re-allocating the resource from the standard customer to the premium customer;

wherein the means for re-allocating the resource from the standard customer to the premium customer is based on a retrieval rate from the web application server to the database, a time to request and return the displayed web-page, a number of users that a web application at the web application server manages, the target list of the standard customers, a first status of the standard customer, and a second status of the premium customer;

wherein the standard customer has a standard customer penalty for a breach of a service level agreement with the standard customer; and wherein a penalty for the breach of the service level agreement with the premium customer is greater than the standard customer penalty for the breach of the service level agreement with the standard customer.

* * * * *